July 24, 1951  J. D. OVERTON  2,561,750
FISH LURE
Filed June 25, 1948

INVENTOR.
John D. Overton
BY
McMorrow, Berman & Davidson
ATTORNEYS

Patented July 24, 1951

2,561,750

UNITED STATES PATENT OFFICE 2,561,750

FISH LURE

John D. Overton, Arsenal, Ark.

Application June 25, 1948, Serial No. 35,136

1 Claim. (Cl. 43—42.22)

This invention relates to a fish lure.

An object of the invention is to provide a fish lure which is capable of traveling through the water either at or below the surface.

Another object of the invention is to provide a fish lure that can be adjusted to cause the lure to travel at various levels below the surface of the water.

A further object of the invention is to provide a fish lure which is simple in structure, easy to manipulate and highly efficient in action.

Other objects and advantages will become apparent from the following description.

An embodiment of the invention is illustrated by way of example in the accompanying drawings, wherein.

Figure 1:
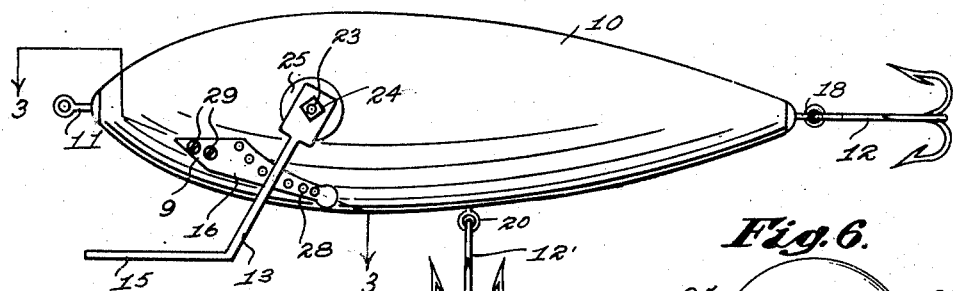
Figure 1 is a side elevational view showing the fish lure according to the present invention.
Figure 6:
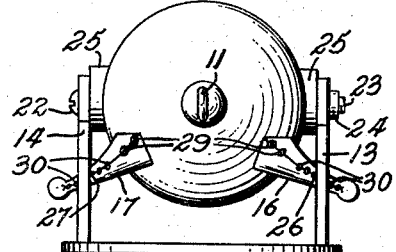
Figure 6 is a front end elevational view of the fish lure shown in Figure 1.
Figure 2:
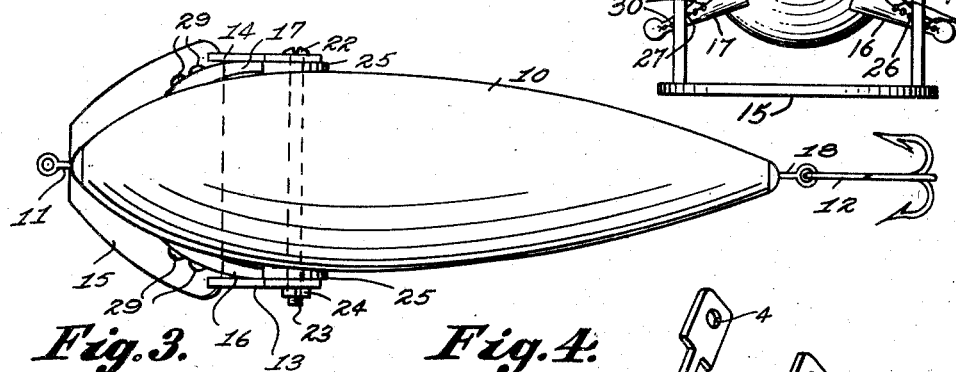
Figure 2 is a top plan view of the device of Figure 1.
Figure 3:
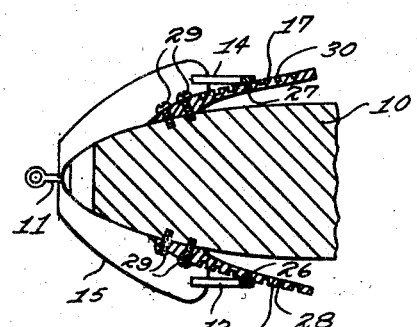
Figure 3 is an enlarged fragmentary sectional view taken on the line 3—3 of Figure 2.
Figure 4:
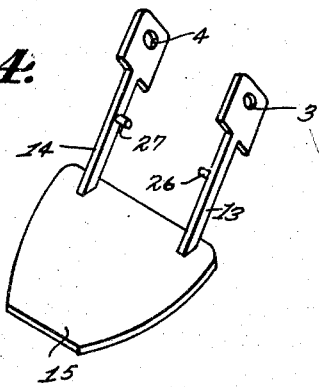
Figure 4 is a perspective view of the spoon.
Figure 5:
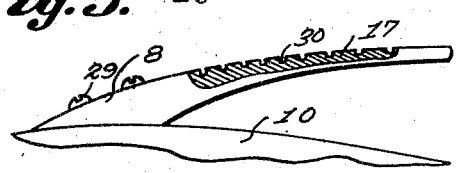
Figure 5 is an enlarged top plan view, sectional in part, of one of the notched bars.

Referring to the drawings, the fish lure of the present invention broadly comprises a plug 10 provided with a screw eye 11 at its forward end for attachment to a fish line and a screw eye 18 at its rearward end to which is attached a fish hook 12. Dependingly supported by the plug 10, as by a screw eye 20, is a fish hook 12'. Positioned adjacent the forward end of the plug 10 and mounted on said plug for arcuate movement about a horizontal axis is a spoon 15.

Extending transversely through the plug 10 intermediate its ends is a headed bolt 22 having a threaded end 23. Arranged on each side of the plug and pivotally connected to the bolt 22 are straps 13 and 14 having openings 3 and 4, respectively, for rotatably receiving the bolt 22 therein. The straps 13 and 14, which carry the spoon 15, are preferably made of a flat strip of aluminum. A nut 24 is threaded on the threaded end 23 of the bolt for locking the straps on the bolt. Arranged on the bolt 22 between each of the straps 13 and 14 and the plug 10 is a washer 25. Positioned intermediate the ends of the strap 13 and secured to the inner face thereof is a cylindrical detent 26, and arranged intermediate the ends of the strap 14 and secured to the inner face thereof is a cylindrical detent 27. The detents 26 and 27 are arranged in opposed aligned relation with respect to each other. It is to be noted that the straps 13 and 14 are positioned at an angle with respect to the spoon 15.

A bar 16 provided with a plurality of circular recesses 28 arranged in spaced relation therealong has an end 9 secured to one side of the plug 10 adjacent the forward end of the latter. A bar 17 likewise provided with a plurality of circular recesses 30 arranged in spaced relation therealong has an end 8 secured by means of screws 29 to the other side of the plug 10 adjacent the forward end of the latter, the bars 16 and 17 extending rearwardly between the respective straps and the plug. The notched bars are fabricated of a resilient material, preferably spring steel.

In the use of the improved fish lure, the plug 10 is drawn through the water by means of a fish line attached to the screw eye 11. The plug 10 may be maintained at any desired depth in the water, or may even be adjusted to ride upon the surface of the water, by adjusting the angular position of the spoon 15 with respect to the plug 10. Thus, to adjust the spoon 15, the user moves the resilient notched bars 16 and 17 toward the plug 10 so that the straps 13 and 14 carrying the spoon 15 may be pivoted about the bolt 22. The spoon in its adjusted position is releasably locked in such position by means of the detents 26 and 27 of the straps 13 and 14, respectively, engaging the adjacent one of the notches 28 and 30 of the bars 16 and 17. In other words, by adjusting the spoon 15 upwardly or downwardly about its pivot or bolt 22, the lure may be caused to travel either on the surface of the water or at different levels below the surface.

It is believed that the details of construction, manner of use and advantages of the device will be readily understood from the foregoing without further detailed explanation. It is to be understood, however, that even though I have herein shown and described a preferred embodiment of my invention, the same is susceptible of certain changes fully comprehended by the spirit of the invention as herein described, and the scope of the appended claim.

I claim:

In a fish lure including a plug adapted to be towed through water by a fish line, and a plurality of fish hooks carried by said plug, the improvement consisting of mounting means on said plug for arcuate movement about a horizontal axis to thereby control the level of travel of said plug through the water, said means comprising straps positioned on each side of said plug adjacent the forward end of the latter, said straps having one end connected to said plug and mounted for pivotal movement about a horizontal axis, a spoon arranged on the forward portion of said plug and secured to the other end of said straps, means for releasably locking said spoon in its pivoted positions, said last-named means comprising a detent secured to the inner face of each of said straps, and a bar interposed between each of said straps and the adjacent side of the plug, there being a plurality of spaced recesses in each of said bars for receiving said detents.

JOHN D. OVERTON.

REFERENCES CITED

The following references are of record in the file of this patent:

UNITED STATES PATENTS

| Number | Name | Date |
|---|---|---|
| 956,872 | Alger | May 3, 1910 |
| 1,220,921 | Wilson | Mar. 27, 1917 |
| 1,232,211 | Burkman | July 3, 1917 |
| 1,466,601 | Sanders | Aug. 28, 1923 |
| 1,548,238 | Adams | Aug. 4, 1925 |
| 2,235,331 | Pugh | Mar. 8, 1941 |